United States Patent [19]

Nitschke et al.

[11] 4,341,546
[45] Jul. 27, 1982

[54] ROLL DRIVE MECHANISM FOR GLASS SHEET PROCESSING EQUIPMENT

[76] Inventors: Norman C. Nitschke, 9102 Buck Rd., Perrysburg, Ohio 43551; Ronald A. McMaster, 420 Water St., Woodville, Ohio 43469

[21] Appl. No.: 237,828

[22] Filed: Feb. 25, 1981

[51] Int. Cl.³ ............................................. C03B 35/18
[52] U.S. Cl. ...................... 65/163; 65/273; 65/349; 65/350; 198/575; 198/783
[58] Field of Search ................. 65/163, 273, 349, 350; 198/575, 783

[56] References Cited

U.S. PATENT DOCUMENTS

| | | | |
|---|---|---|---|
| 1,856,668 | 5/1932 | Sylvester | 65/163 X |
| 3,792,993 | 2/1974 | Artama et al. | 65/163 |
| 3,806,312 | 4/1974 | McMaster et al. | 432/121 |
| 3,934,970 | 1/1976 | McMaster et al. | 432/121 |
| 3,947,242 | 3/1976 | McMaster et al. | 432/122 |
| 3,994,711 | 11/1976 | McMaster | 65/163 |
| 4,133,667 | 1/1979 | Nitschke | 65/163 |

*Primary Examiner*—Arthur D. Kellogg
*Attorney, Agent, or Firm*—Reising, Ethington, Barnard, Perry & Brooks

[57] ABSTRACT

A roll drive mechanism (14) for a horizontal roller conveyor (12) of glass sheet processing equipment (10) has particular utility with a heating furnace (18) of a glass sheet tempering system. First and second continuous drive loops (22,24) of the drive mechanism extend along the conveyor and are alternately engageable in a driving relationship with conveyor rolls (16) over associated lengths (26,28,30) of the conveyor that are selectively adjustable to provide a desired transition between adjacent conveyor sections driven by different drive loops. First and second electric motor drives (32,34) respectively drive the loops to provide synchronous or independent glass sheet conveyance over the different lengths of the conveyor. A pair of each of the first and second drive loops (22,24) are preferably utilized with opposite ends of the conveyor rolls supported thereon and having driven and reduced size portions (88,90 and 86,92) that permit end-for-end roll repositioning to adjust the transition between the driving of the loops. The preferred construction utilizes chains as the drive loops (22,24) with the roll ends projecting outwardly through side slots (66) in the furnace (18) for frictional driving of the rolls by the chains.

13 Claims, 7 Drawing Figures

ROLL DRIVE MECHANISM FOR GLASS SHEET PROCESSING EQUIPMENT

TECHNICAL FIELD

This invention relates to glass sheet processing equipment of the type including a horizontal roller conveyor having a drive mechanism for driving rolls of the conveyor.

BACKGROUND ART

U.S. Pat. No. 3,806,312 discloses a glass sheet tempering system whose furnace includes a horizontal roller conveyor having a frictional drive mechanism for driving rolls of the conveyor in order to provide conveyance of glass sheets over the rolls. The rolls of the conveyor span the gap between a pair of spaced horizontally extending surfaces over which driving reaches of a pair of continuous drive loops are respectively driven to support and frictionally drive the ends of the rolls. Both support surfaces are located within the heating chamber of the furnace and the drive loops utilized are solid steel belts which can withstand the high temperature present upon passage through the heating chamber. During operation of this drive mechanism, the driving reaches of the continuous drive loops are maintained taut so as to maintain the upper surfaces of the rolls in a single plane along which the glass sheets are conveyed over the rolls. Also, a coupling between a pair of drive sheaves that respectively drive the continuous pair of drive loops at one end of the system and adjustable supports for each of the sheaves provides coordinated driving thereof in a manner that ensures conveyance of the glass sheets in the direction intended with minimal lateral drift. Upon commercial introduction into the glass tempering industry less than 10 years ago, this frictional drive mechanism was accorded immediate recognition and is currently being utilized in glass tempering systems throughout the world.

U.S. Pat. Nos. 3,934,970 and 3,947,242 each disclose a glass tempering system including a furnace whose roller conveyor has the basic type of frictional drive mechanism discussed above with ends of the conveyor rolls projecting outwardly through side slots defined between upper and lower housings of the furnace. The continuous drive loops of the drive mechanism are driven over external support surfaces to support and frictionally drive the roll ends and thus operate at a much lower temperature than is the case when located within the heating chamber. The lower temperature involved with this external location facilitates the use of continuous chains for the drive loops as opposed to the solid steel belts that are utilized when the drive loops pass through the heating chamber. These chains have teeth that permit positive driving thereof by toothed sheaves associated therewith as opposed to depending on frictional wrap force about the sheaves as with the solid steel belts. Also, the chains can bend to a much smaller radius of curvature than the solid steel belts and thereby permit the use of smaller diameter sheaves.

U.S. Pat. No. 3,994,711 discloses another glass tempering system incorporating the type of frictional drive mechanism discussed above but with the conveyor of the furnace driven in an oscillatory manner so as to oscillate a glass sheet or sheets being heated independently of a roller conveyor of the associated quench unit where the glass is subsequently tempered. During an index cycle, the furnace and quench unit conveyors are coupled to provide coordinated conveyance of a heated glass sheet or sheets from the furnace into the quench unit. A first electric motor drive mechanism of this system drives a roller conveyor of a load station as well as the roller conveyor of the furnace while a second electric motor drive mechanism drives a roller conveyor of an unload station as well as the roller conveyor of the quench unit. During oscillatory driving of glass being heated within the furnace and independent oscillation of glass being cooled within the quench unit, the roller conveyors of the load and unload stations are respectively uncoupled from the first and second electric motor drive mechanisms so as to permit loading of glass to be tempered at the load station and unloading of tempered glass at the unload station. The oscillatory driving of the furnace roller conveyor considerably shortens the length of the total system while still conveying the heated glass sufficiently fast to prevent sagging thereof between the spaced rolls of the conveyor.

U.S. Pat. No. 4,133,667 discloses a continuous drive loop mechanism of the type discussed above wherein two sheaves on which each drive loop is received are driven in opposite directions with different torques. Such a drive maintains a taut condition of the driving reach of the drive loop and thereby facilitates maintenance of the rolls driven thereby in proper alignment for conveyance of glass in a single plane.

DISCLOSURE OF INVENTION

An object of the present invention is to provide a roll drive mechanism for a roller conveyor of glass sheet processing equipment wherein different lengths of the conveyor with a selectively adjustable transition therebetween are driven in synchronism or independently of each other.

In carrying out the above object, the roll drive mechanism includes first and second continuous drive loops extending along the conveyor and alternately engageable in a driving relationship with the rolls of the conveyor over associated lengths thereof which are selectively adjustable to provide the adjustable transition between the driving of the rolls. A first drive of the mechanism drives the first drive loop to rotatively drive the rolls engaged therewith over the associated conveyor length. A second drive of the mechanism drives the second drive loop to rotatively drive the rolls engaged therewith over the associated conveyor length. Driving of the first and second drive loops together or independently of each other provides synchronous or independent glass sheet conveyance over the associated lengths of the conveyor.

The drive mechanism has particular utility when used with a glass sheet heating furnace of a tempering system at furnace entrance and/or exit locations where it is most often desirable to rapidly introduce and/or exit glass sheets to and from the furnace so as to decrease the time during which opposite ends of the glass sheets are subjected to relatively hot and cold temperatures in a manner that can cause warpage. During such fast introduction and exiting, the glass sheets being heated on the rest of the conveyor can be conveyed independently at a desirable rate that is sufficiently fast so that sagging between the conveyor rolls does not take place but not so fast as to require an excessively long furnace or an excessive number of oscillations during the heating. Production runs of glass sheet loads with different lengths along the length of the conveyor can readily be accommodated for without wasted space between the loads by adjusting the location of the transition between the rolls driven by each drive loop. When utilized with a flat glass sheet tempering furnace having opposite entrance and exit ends, one of the drive loops drives the conveyor rolls adjacent the entrance and exit ends while the other drive loop drives the conveyor rolls therebetween such that there are two adjustable transitions on opposite sides of which the conveyor rolls can be driven in synchronism or independently of each other.

In its preferred construction, the drive mechanism includes an elongated support extending horizontally along the conveyor with frictional driving reaches of the first and second drive loops driven over the elongated support. Each roll has a frictional driven portion that is supported and frictionally driven by either the first or second drive loop so as to provide the synchronous or independent conveyance of glass sheets over different lengths of the conveyor. Each roll also includes a reduced size portion along the length thereof as well as its larger size driven portion. The conveyor rolls are each positioned for either: (1) support and frictional driving of the driven portion of the roll by the first drive loop with the second drive loop disengaged therewith at the reduced size portion thereof, or (2) support and frictional driving of the driven portion thereof by the second drive loop with the first drive loop disengaged therewith at the reduced size portion thereof such that either drive loop selectively drives each roll.

As disclosed, both the first and second drive loops extend along the entire length of the roller conveyor such that the rolls can be positioned to provide load and unload sections driven by one of the drive loops at opposite ends of the conveyor and to also provide a main conveyor section driven by the other drive loop between the load and unload sections. Upon indexing of glass sheets into and out of the associated furnace heating chamber, the load and unload sections are driven independently of the main conveyor section to rapidly convey a glass sheet load into the heating chamber on the load section and concomitantly rapidly convey a heated glass sheet load from the unload section out of the heating chamber while glass being heated on the main conveyor section is conveyed independently. Thereafter, the load and unload conveyor sections are driven in synchronism with the main conveyor section to convey glass from the load section to the main section and from the main section to the unload section in preparation for the next indexing. Appropriate positioning of the rolls for the size of glass sheet loads being heated minimizes wasted space between the loads on the main conveyor section in order to provide most efficient operation.

The drive mechanism of the glass processing equipment most preferably includes a pair of the first continuous drive loops and a pair of the second continuous drive loops, and each roll has opposite ends each of which includes both driven and nondriven portions. One drive loop of each pair extends along the elongated horizontal support adjacent one end to each roll at the driven or nondriven portion thereof and the other drive loop of each pair extends along the horizontal support adjacent the other end of each roll at the driven or nondriven portion thereof such that the rolls can be positioned for support and rotational driving thereof by either pair of drive loops.

A preferred construction of the rolls and a preferred positioning arrangement of the drive loops permit the rolls to be repositioned end-for-end to selectively provide support and frictional driving thereof by one or the other pair of the drive loops. Each roll spans the gap between spaced support surfaces that define the elongated horizontal support and respectively support one drive loop of each pair. One end of each roll has the drive portion thereof located at its extreme end and a reduced size nondriven portion positioned adjacent thereto toward the center of the roll. The other end of each roll has a reduced size nondriven portion located at its extreme end and has the driven portion thereof positioned adjacent its reduced size portion toward the center of the roll. One drive loop of each pair is positioned outboard from the adjacent drive loop of the other pair on the associated support surface. Repositioning of the rolls in an end-for-end manner selectively supports the driven portions of each roll on one or the other pair of drive loops with the reduced size portions of the roll ends aligned with the other pair of drive loops.

The roll ends with the driven and reduced size portions thereof project outwardly through side slots in the housing of the furnace, and the spaced support surfaces along which the drive loops are driven are located externally of the heating chamber such that the lower temperature as compared to within the heating chamber allows the drive loops to be embodied by continuous chains. An intermediate portion of each roll extends through the heating chamber between the ends thereof to support and convey glass sheets through the heating chamber of the furnace housing. The housing preferably includes a fixed lower portion as well as a vertically movable upper portion which has a lower use position where the side slots are cooperatively defined between the housing portions with the roll ends projecting outwardly through the side slots. Upward movement of the upper housing portion provides access to the interior of the heating chamber and also allows the rolls to be removed and repositioned end-for-end to selectively change the pair of continuous chains which provide driving of each roll as may be required by the size of the loads to be heated.

The main section of the conveyor can be driven by the associated drive to convey glass sheets in a unidirectional manner, in an oscillatory manner with the same extent of movement in each direction generally between the ends of the main section, or in an oscillatory manner with a greater extent of movement toward one direction than toward the other direction.

The above object and other objects of the present invention are readily apparent from the following detailed description of the best mode for carrying out the invention when taken in connection with the accompanying drawings.

BEST MODE FOR CARRYING OUT THE INVENTION

Figure 1:
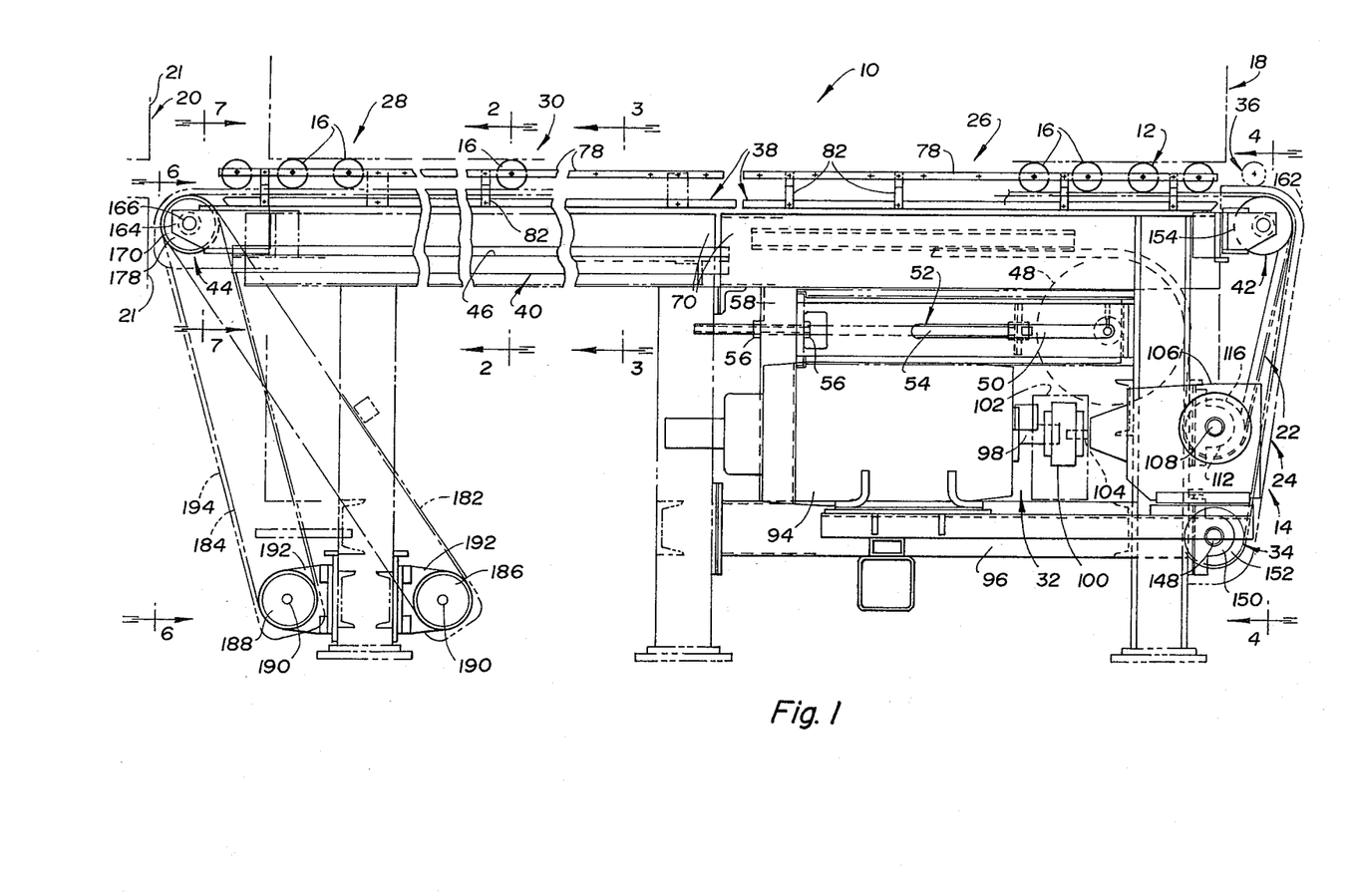
FIG. 1 is a side elevation view of a glass tempering furnace having a drive mechanism constructed in accordance with the present invention to drive rolls of a roller conveyor associated with the furnace.

Referring to FIG. 1 of the drawings, glass sheet processing equipment embodied by a tempering system 10 includes a horizontal roller conveyor 12 whose roll drive mechanism 14 is constructed in accordance with the present invention. Conveyor 12 includes elongated horizontal rolls 16 for conveying glass sheets through the heating chamber of a schematically indicated furnace 18 for heating thereof in preparation for rapid cooling by a schematically indicated quench unit 20 where banks of upper and lower nozzles 21 supply quenching air to the upper and lower surfaces of the glass sheet. Drive mechanism 14 includes first and second continuous drive loops 22 and 24 extending along the conveyor and alternately engageable in a driving relationship with the rolls 16 over associated lengths of the conveyor. The first drive loop 22 drives the conveyor rolls 16 at a load section 26 of the conveyor and an unload section 28 thereof while the second drive loop 24 drives the conveyor rolls 16 of a main conveyor section 30 between the load and unload sections. As is hereinafter described, the transition between both the load section 26 and the main section 30 as well as the transition between the main section 30 and the unload section 28 are adjustable as may be required for the particular length of sheet glass loads to be tempered in order to minimize wasted space between the loads. Drive mechanism 14 also includes a first electric motor drive 32 for driving the first drive loop 22 associated with the load and unload conveyor sections 26 and 28. A second electric motor drive 34 of drive mechanism 14 drives the second continuous drive loop 24 associated with the main conveyor section 30. Coordinated driving of the first and second electric motor drives 32 and 34 operates the load and unload conveyor sections 26 and 28 in synchronism with the main conveyor section 30, and independent driving of the two electric motor drives operates the load and unload conveyor sections independently of the main conveyor section.

During heating of glass sheets on the main conveyor section 30 shown in FIG. 1, the load and unload conveyor sections 26 and 28 can convey glass sheets independently of the main conveyor section to provide rapid indexing of glass sheets to be heated into the heating chamber as well as concomitant rapid indexing of heated glass sheets out of the furnace heating chamber. As such, glass sheets being indexed into the heating chamber at the right end of the furnace from a load table conveyor 36 whose single roll is illustrated move sufficiently fast so that the leading and trailing ends thereof are subjected to hot and cold temperature differentials for only a relatively short period of time. Likewise, the heated glass sheet being indexed from the left end of the furnace heating chamber into the quench unit 20 also has its leading and trailing ends subjected to cold and hot temperatures for only a relatively short period of time due to the rapid indexing.

During heating of glass sheets, the rolls of the main conveyor section 30 can be driven by the associated drive 34 to convey glass sheets in various ways independently of the load and unload sections of the conveyor. The glass sheets may be conveyed on the main conveyor section 30 in a unidirectional manner at a rate that is just fast enough to prevent sagging thereof between the conveyor rolls 16 as the glass reaches its fully heated temperature just prior to indexing into the quench unit. The glass sheets being heated on the main conveyor section 30 can also be conveyed in an oscillatory manner to the left and the right either: (1) with the same extent of movement in each direction in a generally end-for-end fashion between the ends of the main conveyor section; or (2) with a greater extent of movement toward the left than toward the right so as to eventually move to just adjacent the unload conveyor section 28.

Regardless of the type of conveyance during heating on the main conveyor section 30, both the load and unload conveyor sections 26 and 28 are driven in a coordinated manner with the main conveyor section to index glass from the load section onto the right end of the main section and from the left end of the main section onto the unload section. Thereafter, the first electric motor drive 32 is driven independently of the second electric motor drive 34 to index glass into the furnace onto the load conveyor section 26 and to also index glass out of the furnace from the unload conveyor section 28. Subsequent coordinated driving of the electric motor drives 32 and 34 then begins another cycle. The relative lengths of the load and unload sections 26 and 28 of the conveyor and the transitions thereof with the main conveyor section 30 are adjustable to permit a glass sheet or a glass sheet load of any desired length to be received thereby without any excessive extra length that would result in wasted space between the glass upon eventual transfer to the main conveyor section where most of the heating takes place.

An elongated support extending horizontally along the conveyor 12 is identified in FIG. 1 by reference numeral 38 and upper frictional driving reaches of each of the continuous drive loops 22 and 24 are slidably driven over the elongated support with a driven portion of each conveyor roll 16 supported and frictionally driven by one or the other of the drive loops, as is hereinafter more fully described, to provide the selective rotational driving. A framework 40 mounts the elongated support 38 and also supports entrance and exit end sheave assemblies 42 and 44 that receive the first and second drive loops 22 and 24 with the driving reaches thereof extending between the upper extremeties of the end sheave assemblies. A return reach of each drive loop 22 and 24 extends from the left end sheave assembly 44 over a return support 46 to associated slack take-up wheels 48 (only one shown) which are each mounted by an adjustable clevis 50 for movement toward the left and the right. An adjuster 52 for each slack take-up wheel 48 includes a rod 54 whose right end is connected to the clevis 50 and whose threaded left end receives nuts 56 on opposite sides of an apertured frame member 58 through which the adjuster rod extends. Threading movement of the nuts 56 thus moves the adjuster rods 54 and the slack take-up wheels 48 to remove any slack in the drive loops 22 or 24. From the slack take-up wheels 48, each of the drive loops 22 and 24 extends downwardly to their associated electric motor drives 32 and 34, and back upwardly to the entrance end sheave assembly 42.

It will also be noted that the driving reaches of both the first and second drive loops 22 and 24 both extend the entire length of the conveyor 12 in the glass tempering system 10 illustrated in FIG. 1 in order to permit the indexing previously described. However, in other applications, it may also be possible to achieve the adjustable transition between different lengths of a conveyor for glass sheet processing equipment with the driving reaches of the two drive loops overlapping for less than their entire lengths.

Figure 2:
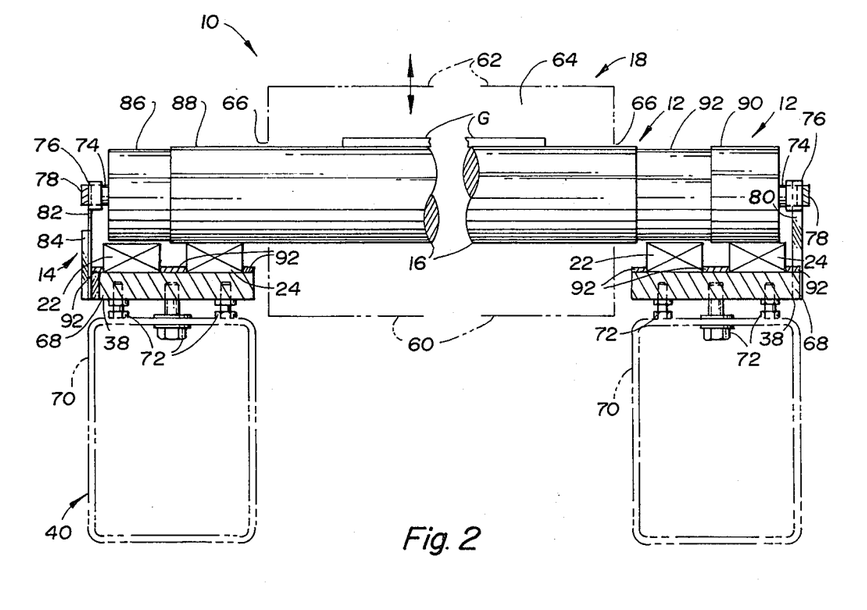
FIG. 2 is a cross sectional view through the glass tempering furnace taken along line 2—2 of FIG. 1 and illustrates the manner in which rolls of the conveyor are driven at an intermediate main section of the conveyor where heating takes place.
Figure 3:
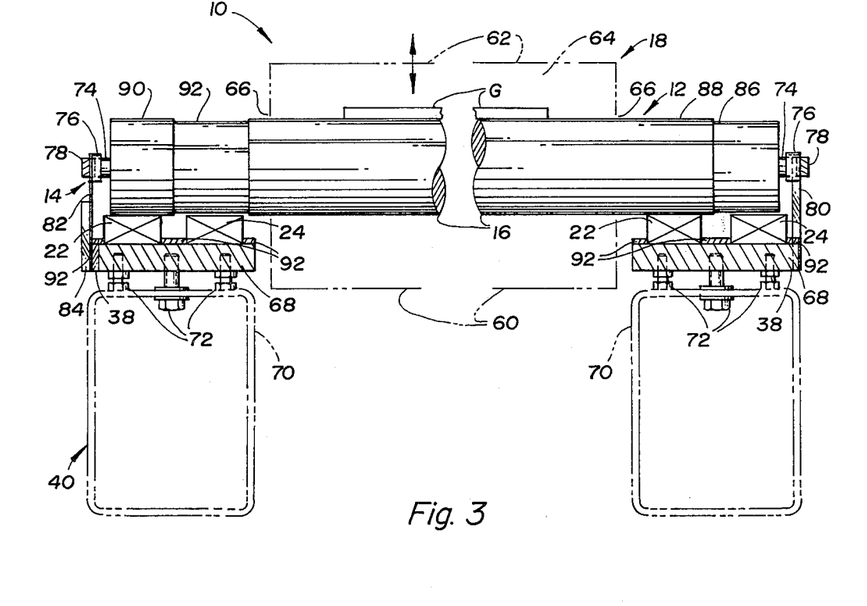
FIG. 3 is a cross sectional view through the glass tempering furnace taken along line 3—3 of FIG. 1 and illustrates the manner in which the conveyor rolls are driven at both load and unload conveyor sections respectively located at opposite ends of the main conveyor section.

The preferred construction of the furnace 18 and conveyor 12 are further illustrated in FIGS. 2 and 3 which show that the furnace has an upwardly opening fixed lower housing portion 60 as well as a vertically movable upper housing portion 62 that cooperatively define a heating chamber 64 in a lower use position of the upper housing portion. Upward movement of the upper housing portion 62 to an open position provides an operator access to the interior of the heating chamber 64 for maintenance, repair or adjustment of the rolls 16 to change the transitions between the different sections of the conveyor. Side walls of the lower and upper housing portions 60 and 62 cooperate in the lower use position of the upper housing portion to define side slots 66 through which the ends of the rolls 16 project from a central or intermediate conveying portion thereof on which glass sheets G are conveyed through the heating chamber 64.

Drive mechanism 14 of the conveyor 12 includes a pair of each of the first and second drive loops 22 and 24 as seen in FIG. 3 with one drive loop of each pair respectively associated with the adjacent outwardly projecting ends of the rolls 16 at each side of the furnace housing 18. The elongated support 38 along which the drive loops 22 and 24 are slidably driven is embodied by a pair of spaced support members 68 mounted on spaced frame members 70 by adjustable bolt and nut connections 72 in order to provide adjustment that maintains the upper surfaces of the rolls 16 in a planar condition so as to maintain glass sheet planarity.

As seen in FIGS. 2 and 3, each roll end includes a central end pin 74 received within an associated positioner 76 secured in any suitable manner to a longitudinally extending rail 78 that extends along the outboard side of the associated support member 68. The rail 78 on the right side of the tempering system is supported by upwardly extending rigid supports 80 whose lower ends are fixedly secured to the right support member 68 in any suitable manner and whose upper ends are likewise fixedly secured to the right rail in any suitable manner. The left rail 78 is supported by upwardly extending leaf springs 82 each of which has its lower end secured between the left support member 68. Positioners 76 engage the axial ends of the roll pins 74 under the bias of leaf springs 82 to axially position the rolls. Deflection of leaf springs 82 prevents binding that could stop roll rotation, e.g. any axial expansion of the rolls upon heating is accommodated for by deflection of the leaf springs. Preferably, the positioners define inwardly opening grooves that extend vertically such that any roll can be removed and replaced by vertical upward and downward movement without disturbing the other rolls.

The external locations of the support members 68 shown in FIGS. 2 and 3 permits the drive loops 22 and 24 to be embodied by chains as the temperature is much lower than within the heating chamber of the furnace housing. As such, teeth on the end sheave assemblies 42 and 44 provide a positive driving relationship with teeth on the drive chains and the sheave assemblies can have a much smaller diameter than is possible with solid steel belts that cannot bend to as small of a radius of curvature as the chains.

As seen by continued reference to FIGS. 2 and 3, one outwardly projecting end of each conveyor roll 16 includes an extreme end having a reduced size nondriven portion 86 and also includes an adjacent larger diameter driven portion 88 located toward the intermediate conveyor roll portion from the associated reduced size portion. The other end of each conveyor roll 16 includes an extreme end having a driven portion 90 and also includes an adjacent reduced size nondriven portion 92 of a smaller diameter located toward the intermediate conveyor roll portion from the associated driven portion. At the main conveyor section as illustrated in FIG. 2, the conveyor rolls 16 are each positioned with the end having the reduced size portion 86 and driven portion 88 projecting outwardly through the left housing side slot 66 and with the end having the driven portion 90 and reduced size portion 92 projecting outwardly through the right housing side slot 66.

Along the entire length of the conveyor, the first drive chain 22 on the left support member 68 (as viewed in FIGS. 2 and 3) is located outboard from the second drive chain 24 on the left support member, and the second drive chain 24 on the right support member 68 is located outboard from the first drive chain 22 on the right support member. As such, at the main conveyor section as illustrated in FIG. 2, the first pair of drive chains 22 are aligned with the reduced size roll portions 86 and 92 in a disengaged relationship, and the larger diameter driven portions 88 and 90 are supported on the second pair of drive chains 24 for frictional driving thereof upon sliding movement of the second pair of drive chains along the support members 68.

At both the load and unload sections 26 and 28 of the conveyor, the conveyor rolls 16 are located as shown in FIG. 3 end-for-end from the roll positioning along the main conveyor section such that the first pair of drive chains 22 supports the driven portions 88 and 90 of the roll with the second pair of drive chains 24 aligned with the reduced size roll portions 86 and 92 in a disengaged relationship. The conveyor rolls 16 at the main conveyor section can thus be driven independently or synchronously with the conveyor rolls at the load and unload sections by independent or coordinated driving of the first and second pairs of drive chains 22 and 24. It will be noted that plates 92 are secured in any suitable manner to the upper surfaces of the support members 68 to define shallow channels that function as slideways for the drive chains 22 and 24 in order to prevent lateral drift and to thereby maintain the chains in alignment with the appropriate conveyor roll end portions as discussed above.

The transition between the conveyor load section 26 and main conveyor section 30 as shown in FIG. 1 as well as the transition between the main conveyor section and the unload conveyor section 28 can both be readily adjusted by repositioning the conveyor rolls 16 end-for-end between the positions shown in FIGS. 2 and 3. As previously mentioned, this repositioning minimizes wasted space between glass sheets conveyed on the main conveyor section 30 during heating and thereby promotes efficient operation of the system.

Figure 4:
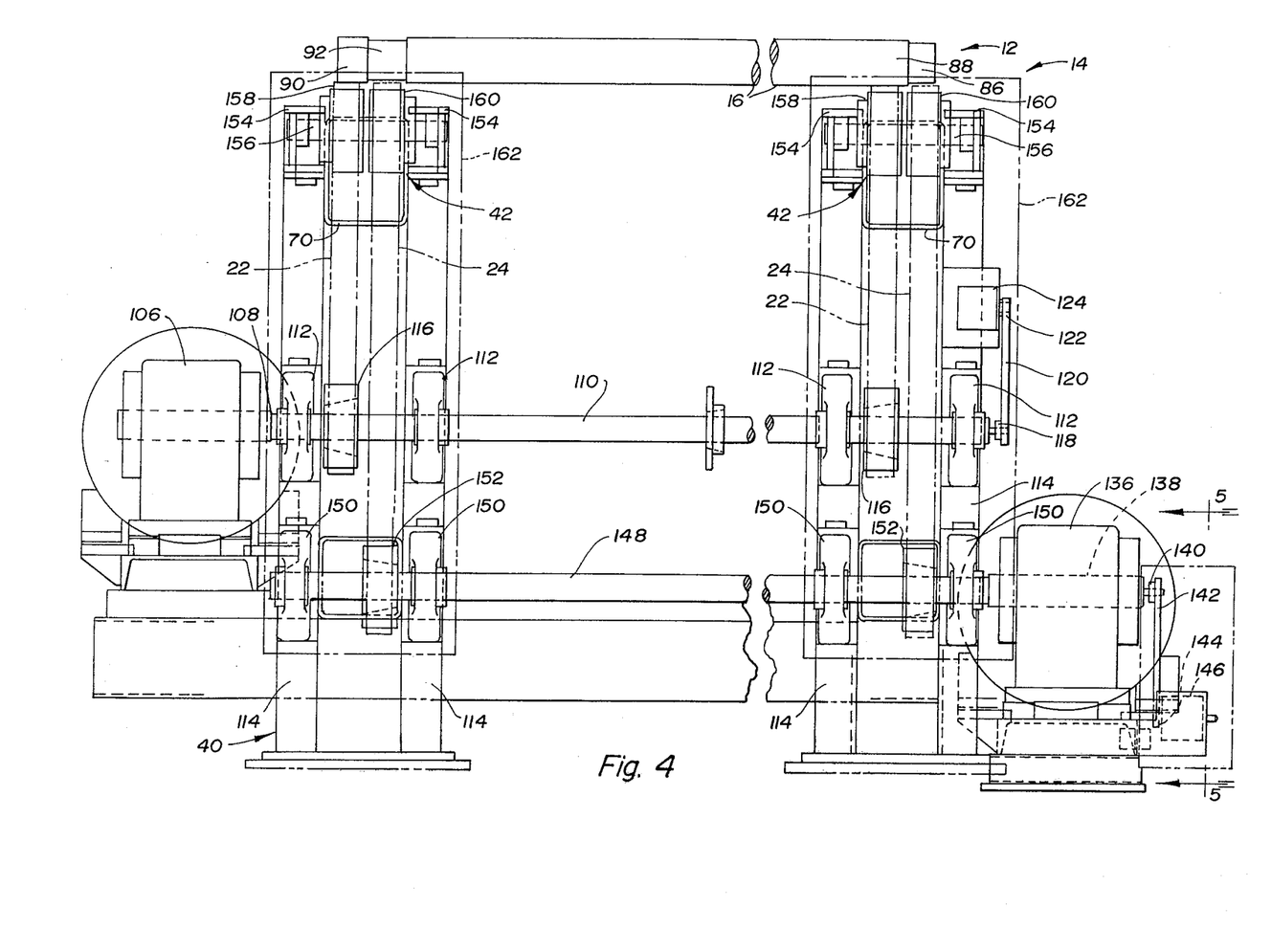
FIG. 4 is an end elevation view of the furnace taken adjacent the load section of the conveyor along the direction of line 4—4 in FIG. 1 to illustrate first and second electric motor drives of the conveyor drive mechanism.

The first drive 32 is illustrated in FIG. 1 as including an electric motor 94 mounted in any suitable manner on a frame member 96 and having an output shaft 98 that is connected to a coupling 100 received within a schematically illustrated housing 102 that is also mounted on the frame member 96. Coupling 100 is also connected to an input shaft 104 of a reduction gear unit 106 mounted on the framework 40. An output shaft 108 of the reduction gear unit 106 extends transversely to the input shaft 104 thereof and, as seen in FIG. 4, is connected to the extreme left end of a coupling shaft 110. The opposite ends of coupling shaft 110 are rotatably supported by associated pairs of journal bearings 112 that are mounted on frame legs 114 at each side of the conveyor. Between each pair of bearings 112, the coupling shaft 110 carries a toothed drive sheave 116 that meshes with teeth of the aligned drive chain 22 in a positive driving relationship between the associated slack take-up wheel 48 and the end sheave assembly 42 as shown in FIG. 1. Also, as seen in FIG. 4, the extreme right end of the coupling shaft 110 drives a pulley 118 that receives and drives a continuous belt 120 for driving a pulley 122 of an encoder 124 for monitoring the conveyance of glass on the load and unload conveyor sections.

Figure 5:
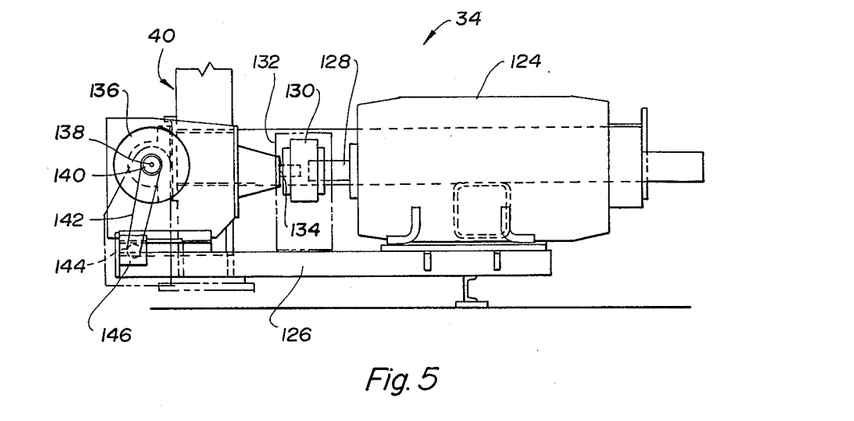
FIG. 5 is an elevation view taken along the direction of line 5—5 in FIG. 4 to further illustrate one of the electric motor drives.

With reference to FIG. 5, the second drive 34 for the main section of the conveyor includes an electric motor 124 mounted on a frame member 126 and having an output shaft 128 that drives a coupling 130 received within a schematically indicated housing 132 also mounted on the frame member 126. Coupling 130 drives an input shaft 134 of a reduction gear unit 136 mounted on the framework 40. An output shaft 138 of the reduction gear unit 136 has one end which drives a pulley 140 that receives a drive belt 142 for driving an input pulley 144 of an encoder 146 in order to monitor glass conveyance on the main conveyor section. The other end of the output shaft 138 of the reduction gear unit 136 is connected as shown in FIG. 4 to the extreme right end of a coupling shaft 148 whose opposite ends are each rotatably supported on the adjacent frame legs 114 by a pair of journal bearings 150. Between each pair of bearings 150, the coupling shaft 148 carries a toothed drive sheave 152 that meshes with teeth of the aligned drive chain 24 in a positive driving relationship between the associated slack take-up wheel 48 and end sheave assembly 42 as best seen in FIG. 1.

With reference to FIG. 4, each of the entrance end sheave assemblies 42 includes a pair of welded plate mounts 154 fixed on the upper ends of the associated frame legs 114 to support an associated transverse shaft 156 that extends between the mounts. A pair of toothed end sheaves 158 and 160 are rotatably mounted by unshown antifriction bearings on the shaft 156 and respectively mesh with teeth on the adjacent first and second drive chains 22 and 24 for driving the conveyor rolls 16 in the manner previously described. Each of the end sheave assemblies 42 and the bearings 112 and 150 mounted on the associated frame legs 114 are received within an associated schematically illustrated housing 162 shown in both FIGS. 1 and 4.

Figure 6:
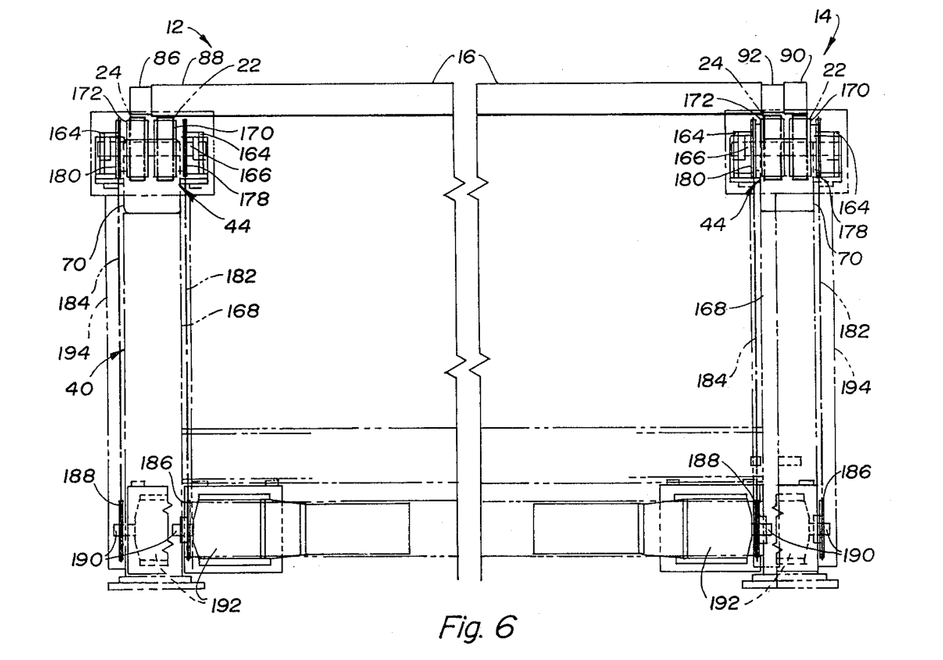
FIG. 6 is an end elevation view of the glass tempering system taken adjacent the unload section of the conveyor along line 6—6 of FIG. 1 and illustrates generators of the drive mechanism for maintaining driving reaches that support the conveyor rolls taut in order to maintain planarity of glass sheets conveyed over the rolls.
Figure 7:
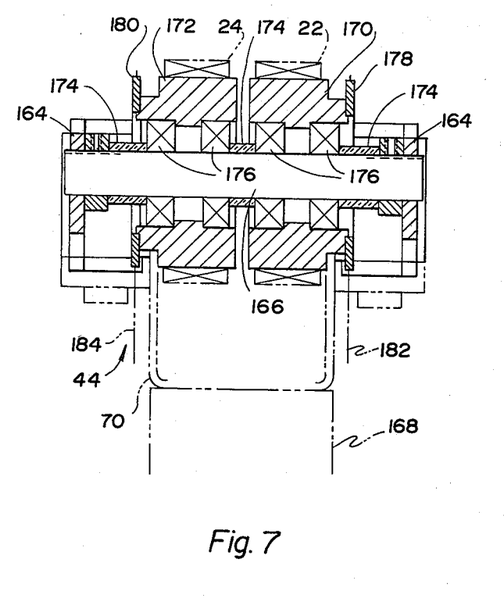
FIG. 7 is a sectional view taken along line 7—7 of FIG. 1 through a sheave assembly that receives drive loops of the conveyor.

Referring now to FIGS. 1, 6 and 7, each of the exit end sheave assemblies 44 includes a pair of welded plate mounts 164 that support a shaft 166 thereof on the upper end of associated frame legs 168. Between the mounts 164, each shaft 166 supports a pair of toothed sheaves 170 and 172 that respectively mesh with the teeth of the aligned first and second drive chains 22 and 24 on the adjacent side of the conveyor. Sleeves 174 shown in FIG. 7 space the end sheaves 170 and 172 from the mounts 164 and from each other. A pair of antifriction bearings 176 rotatably support each toothed sheave 172 and 174 on the shaft 166 to thereby permit independent rotation of the sheaves. It should also be noted that the description of the exit end sheave assembly 44 so far as shown in FIG. 7 is also applicable to the entrance end sheave assemblies 42 previously described.

As illustrated in FIGS. 6 and 7, the toothed sheaves 170 and 172 of each exit end sheave assembly 44 have chain sprockets 178 and 180 mounted thereon for rotation with the end sheaves. Chain sprockets 178 and 180 respectively receive continuous chains 182 and 184 in a driving relationship and, as seen by combined references to FIGS. 1 and 6, these chains are also respectively received by chain sprockets 186 and 188 that drive input shafts 190 of associated electrical generators 192. During forward glass conveyance from the right toward the left as viewed in FIG. 1, the first and second electric motor drives 32 and 34 pull the right ends of the upper driving reaches of chains 22 and 24 toward the right while the torque generated by operation of the generators 192 of the exit end sheave assemblies 44 pulls on the left ends of the driving reaches of these chains toward the left but with a lesser force such that the driving chain reaches are maintained taut during driving of the conveyor. This taut condition of the chains prevents friction with the support surfaces from stretching the chains at certain regions of the conveyor but not at others and thereby ensures driving of all the conveyor rolls at the same speed. The taut condition of the chains also ensures that the conveyor rolls are supported with their upper sides in a single plane in order to maintain planarity of the conveyed glass sheets. Each of the exit end sheave assemblies 44 is received within a schematically indicated housing 194 as shown in both FIGS. 1 and 6 as is the chain 184 and its associated lower chain sprocket 188.

While the best mode for carrying out the invention has herein been described in detail, those skilled in the art to which this invention relates will recognize various alternative designs and embodiments for practicing the present invention as defined by the following claims.

What is claimed is:

1. In glass sheet processing equipment including a horizontal roller conveyor having elongated horizontal rolls spaced along the length thereof extending laterally with respect thereto so as to support and convey glass sheets thereover upon rotation thereof, a roll drive mechanism comprising: first and second continuous drive loops extending along the conveyor in an overlapping relationship with each other and alternately engageable in a driving relationship with the rolls of the conveyor over associated lengths thereof which are selectively adjustable to provide a desired transition between the driving of the rolls; a first drive for driving the first drive loop to rotatively drive the rolls engaged therewith; and a second drive for driving the second drive loop to rotatively drive the rolls engaged therewith, whereby the drive loops can be driven together or independently to provide synchronous or independent glass sheet conveyance over associated lengths of the conveyor.

2. A drive mechanism as in claim 1 further including an elongated support extending horizontally along the conveyor, the first and second drive loops each including a frictional driving reach movable over the elongated support in an overlapping relationship with the driving reach of the other drive loop, and each roll having a frictionally driven portion that is supported and frictionally driven by the driving reach of either the first or second drive loop.

3. A drive mechanism as in claim 2 wherein each roll includes a reduced size portion along the length thereof such that each roll can be positioned for either: (1) support and frictional driving of the driven portion of the roll by the first drive loop with the second drive loop disengaged therefrom at the reduced size portion thereof, or (2) support and frictional driving of the driven portion of the roll by the second drive loop with the first drive loop disengaged therefrom at the reduced size portion thereof, whereby either drive loop and the associated drive thereof selectively drives each roll.

4. A drive mechanism as in claim 3 wherein both the first and second drive loops extend along the entire length of the roller conveyor such that the rolls can be positioned to provide load and unload sections driven by one of the drive loops at opposite ends of the conveyor and a main conveyor section driven by the other drive loop between the ends of the conveyor, whereby the rolls of the main conveyor section can be driven at the same rotational speed and in the same direction as the rolls of the load and unload sections or independently thereof by the first and second roll drives.

5. A drive mechanism as in claim 3 which includes a pair of the first continuous drive loops and a pair of the second continuous drive loops, the rolls each having opposite ends each of which includes driven and reduced size portions adjacent thereto, and one drive loop of each pair extending along the horizontal support adjacent one end of each roll at the driven or reduced size portion thereof and the other drive loop of each pair extending along the horizontal support adjacent the other end of each roll at the driven or reduced size portion thereof such that the rolls can be positioned for support and rotational driving thereof by either pair of drive loops.

6. A drive mechanism as in claim 5 wherein one drive loop of each pair is positioned outboard from the adjacent drive loop of the other pair, one end of each roll having its driven portion at the extreme end thereof and having its reduced size portion positioned adjacent its driven portion toward the intermediate portion of the roll, and the other end of each roll having its reduced size portion at the extreme end thereof and having its driven portion positioned adjacent its reduced size portion toward the intermediate portion of the roll, whereby the roll can be repositioned end-for-end to selectively support and frictionally drive each roll by one or the other pair of drive loops.

7. In a glass sheet heating furnace having a heating chamber and a horizontal roller conveyor that extends through the heating chamber and includes elongated horizontal rolls spaced along the length of the conveyor extending laterally with respect thereto so as to support and convey glass sheets thereover upon rotation thereof such that the glass sheets are conveyed through the heating chamber, a roll drive mechanism comprising: first and second continuous drive loops extending along the conveyor; an elongated horizontal support extending horizontally along the conveyor; each of the drive loops including a driving reach supported on the horizontal support for movement along the length of the conveyor in an overlapping relationship with the driving reach of the other drive loop; each roll including a driven portion that is selectively and alternately supported upon appropriate roll positioning by either the driving reach of the first drive loop or the driving reach of the second drive loop; a first drive for driving the first loop to move the driving reach thereof along the horizontal support and thereby frictionally rotate the rolls supported thereby; and a second drive for driving the second loop to move the driving reach thereof along the horizontal support to frictionally rotate the rolls supported thereby, whereby the drive loops can be driven together or independently to provide synchronous or independent glass sheet conveyance over associated lengths of the conveyor.

8. In a glass sheet heating furnace having a heating chamber and a horizontal roller conveyor that extends through the heating chamber and includes elongated horizontal rolls spaced along the length of the conveyor extending laterally with respect thereto so as to support and convey glass sheets thereover upon rotation thereof such that the glass sheets are conveyed through the heating chamber, a roll drive mechanism comprising: first and second continuous drive loops extending along the entire length of the conveyor; an elongated horizontal support extending horizontally along the entire length of the conveyor; each of the drive loops including a driving reach supported on the horizontal support for movement along the entire length of the conveyor; each roll including a driven portion that is selectively and alternately supported upon appropriate roll positioning by either the driving reach of the first drive loop or the driving reach of the second drive loop; each roll also including a reduced size portion aligned with the driving reach of the other drive loop in a disengaged relationship; a first drive for driving the first loop to move the driving reach thereof along the horizontal support and thereby frictionally rotate the rolls supported thereby; and a second drive for driving the second loop to move the driving reach thereof along the horizontal support to frictionally rotate the rolls supported thereby, whereby the drive loops can be driven together or independently to provide synchronous or independent glass sheet conveyance over associated lengths of the conveyor.

9. In a glass sheet heating furnace having a housing defining a heating chamber and a pair of elongated side slots spaced from each other at opposite sides of the heating chamber, a horizontal roller conveyor that extends through the heating chamber and includes elongated horizontal rolls spaced along the length of the conveyor extending laterally with respect thereto and having roll ends projecting outwardly through the side slots, and each roll also having an intermediate roll portion for supporting and conveying glass sheets thereover upon rotation thereof such that the glass sheets are conveyed through the heating chamber, a roll drive mechanism comprising: first and second pairs of continuous drive chains extending along the conveyor with the drive chains of each pair respectively associated with the sets of roll ends projecting through the pair of housing side slots; an elongated horizontal support having a pair of elongated support surfaces extending horizontally respectively adjacent the pair of housing side slots outside of the heating chamber; each of the drive chains including a driving reach supported on the adjacent horizontal support surface for movement along the length of the conveyor; the ends of each roll including driven portions that are selectively and alternately supported upon appropriate roll positioning by either the driving reaches of the first pair of drive chains or the driving reaches of the second pair of drive chains; the ends of each roll also including reduced size portions aligned with the driving reaches of the other pair of drive chains; a first drive for driving the first pair of drive chains to move the driving reaches thereof along the horizontal support surfaces and thereby frictionally rotate the rolls supported thereby; and a second drive for driving the second pair of drive chains to move the driving reaches thereof along the horizontal support surfaces to frictionally rotate the rolls supported thereby, whereby the drive chains can be driven together or independently to provide synchronous or independent glass sheet conveyance over associated lengths of the conveyor.

10. In a glass sheet tempering system including a furnace having a housing defining a heating chamber and a pair of elongated side slots spaced from each other at opposite sides of the heating chamber, a horizontal roller conveyor that extends through the heating chamber and includes elongated horizontal rolls spaced along the length of the conveyor extending laterally with respect thereto and having roll ends projecting outwardly through the side slots, and each roll also having an intermediate roll portion for supporting and conveying glass sheets thereover upon rotation thereof such that the glass sheets are conveyed through the heating chamber, a roll drive mechanism comprising: first and second pairs of continuous drive chains extending along the entire length of the conveyor with the drive chains of each pair respectively associated with the sets of roll ends projecting through the pair of housing side slots; an elongated horizontal support having a pair of elongated support surfaces extending horizontally along the entire length of the conveyor respectively adjacent the pair of housing side slots outside of the heating chamber; each of the drive chains including a driving reach supported on the adjacent horizontal support surface for movement along the length of the conveyor; one drive chain of each pair being located outboard of the adjacent drive chain on the associated support surface and the other drive chain of each pair being located inboard of the adjacent drive chain on the associated support surface; one end of each roll including a driven portion that is selectively and alternately supported upon end-for-end roll positioning by either the outboard driving reach of one pair of drive chains or the outboard driving reach of the other pair of drive chains; said one end of each roll also including a reduced size portion located adjacent the driven portion thereof toward the intermediate roll portion and selectively and alternately positioned upon end-for-end roll positioning adjacent either the inboard driving reach of said one pair of drive chains or the inboard driving reach of said other pair of drive chains in a disengaged relationship therewith; said other end of each roll including a reduced size portion that is selectively and alternately positioned upon end-for-end roll positioning adjacent either the outboard driving reach of said one pair of drive chains or the outboard driving reach of said other pair of drive chains in a disengaged relationship therewith; said other end of each roll also including a driven portion located adjacent the reduced size portion thereof toward the intermediate roll portion and selectively and alternately supported upon end-for-end roll positioning by either the inboard driving reach of said one pair of drive chains or the inboard driving reach of said other pair of drive chains; a first drive for driving the first pair of drive chains to move the driving reaches thereof along the horizontal support surfaces and thereby frictionally rotate the rolls supported thereby; and a second drive for driving the second pair of drive chains to move the driving reaches thereof along the horizontal support surfaces to frictionally rotate the rolls supported thereby, whereby the drive chains can be driven together or independently to provide synchronous or independent glass sheet conveyance over associated lengths of the conveyor.

11. Apparatus as in claim 7, 8, 9, or 10 wherein the conveyor includes a main section driven by the associated drive to convey glass sheets in a unidirectional manner.

12. Apparatus as in claim 7, 8, 9, or 10 wherein the conveyor includes a main section driven by the associated drive to convey glass sheets in an oscillatory manner with the same extent of movement in each direction.

13. Apparatus as in claim 7, 8, 9, or 10 wherein the conveyor includes a main section driven by the associated drive to convey glass sheets in an oscillatory manner with a greater extent of movement toward one direction than toward the other direction.

* * * * *